W. Van. Anden.
Mower.
No. 39511    Patented. Aug. 11. 1863.
Fig. 3
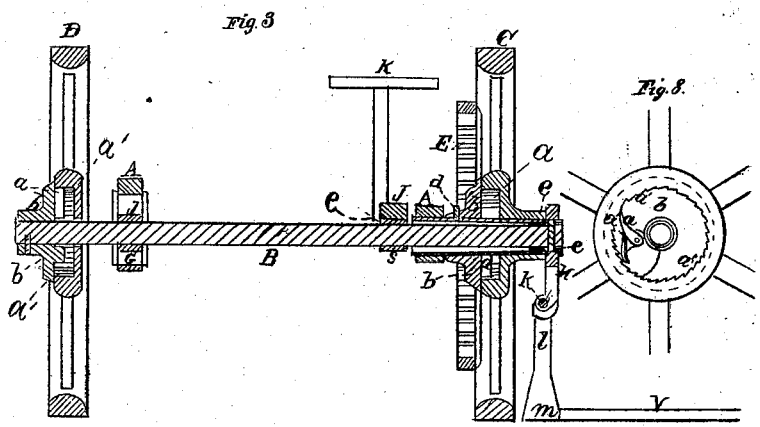
Fig. 8
Fig. 4
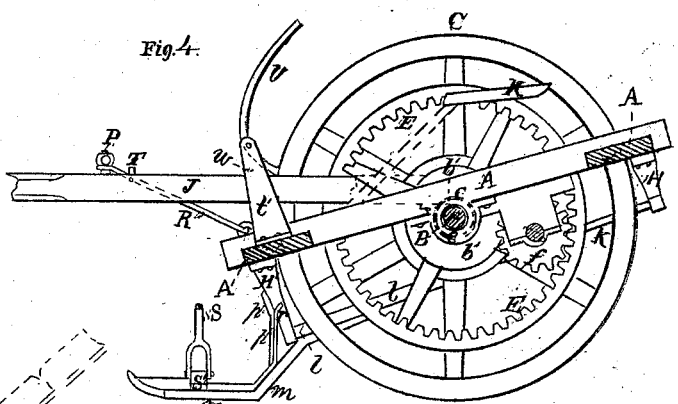
Fig. 5
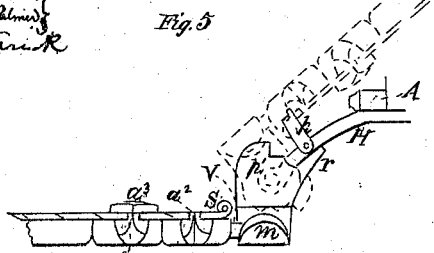
Fig. 6
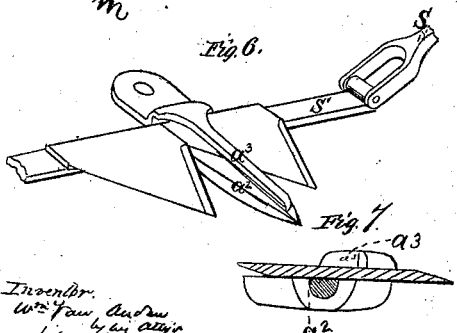
Fig. 7

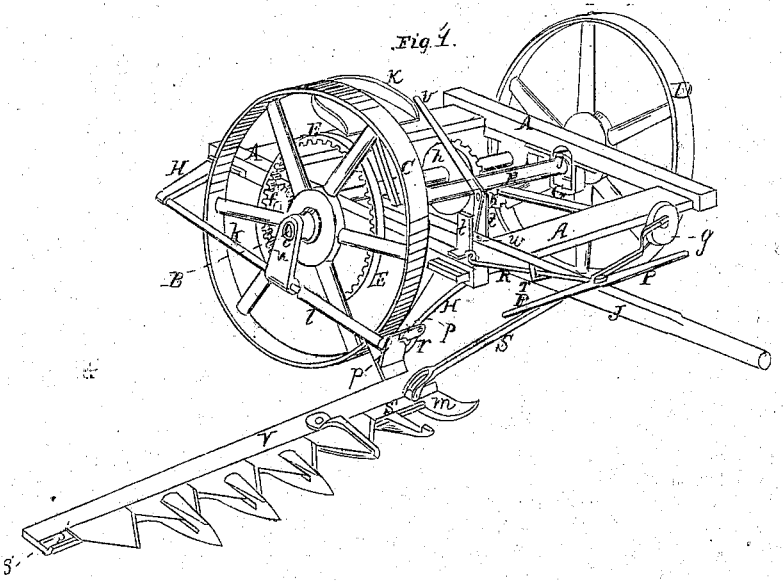
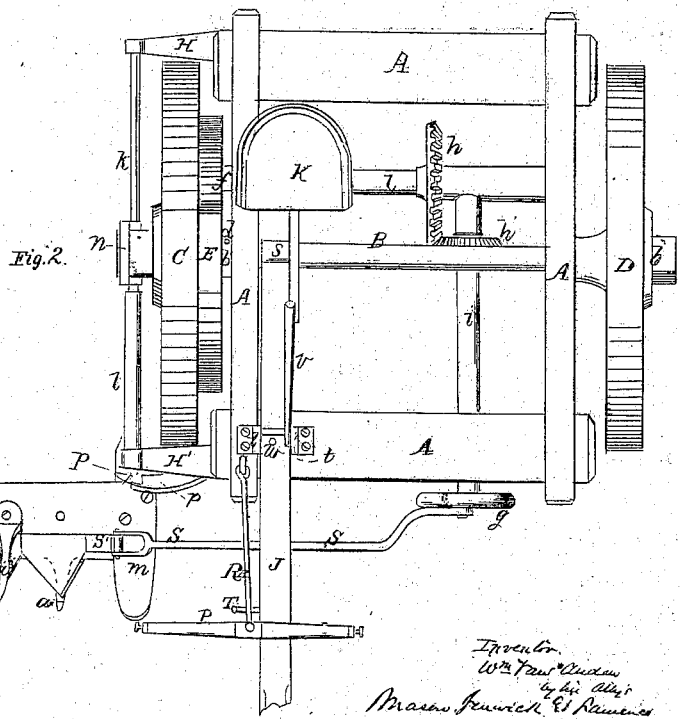

UNITED STATES PATENT OFFICE.

WILLIAM VAN ANDEN, OF POUGHKEEPSIE, NEW YORK.

IMPROVEMENT IN HARVESTERS.

Specification forming part of Letters Patent No. 39,511, dated August 11, 1863.

*To all whom it may concern:*

Be it known that I, WILLIAM VAN ANDEN, of Poughkeepsie, in the county of Dutchess and State of New York, have invented certain new and useful Improvements in Machinery for Mowing and Reaping Grass and Grain; and I do hereby declare that the following is a full, clear, and exact description thereof, reference being had to the accompanying drawings, making a part of this specification, in which—

Figure 1 is a perspective view of my improved machine with the cutting apparatus in a position for operation. Fig. 2 is a plan view of Fig. 1. Fig. 3, Sheet 2, is a longitudinal section through the main shaft and a transverse section through the frame, showing the manner of hanging the draft-frame. Fig. 4 is a longitudinal vertical section through the machine looking toward the side carrying the cutting apparatus. Fig. 5 is a detail view, showing the manner of locking the cutting apparatus or unlocking the same to allow it to be folded up. Fig. 6 shows the improved open tooth and double-beveled edge-cutters. Fig. 7 is a vertical section of the cutter.

Similar letters of reference indicate corresponding parts in the several figures.

This invention relates to that class of machines for mowing and reaping grass and grain in which the draft-frame is supported on two large driving or propelling wheels, and also wherein the cutting apparatus is hinged or pivoted to one side of the frame for the purpose of folding it up out of the way in transporting the machine from place to place.

The object of my invention is to combine in a double-wheel machine the advantages of a transversely-oscillating frame, which is so applied to the axle of the propelling-wheels that while the frame itself is self adjustable and allows the cutting apparatus to rise and fall and accommodate itself to the inequalities in the surface of the land, one of the propelling-wheels is allowed to pass over slight obstructions without affecting the position of the frame or tipping over the main supporting-wheel or affecting the position of the cutting apparatus, as will be hereinafter described.

To enable others skilled in the art to make and use my invention, I will proceed to describe its construction and operation.

In the accompanying drawings, A represents the main draft-frame, which is made up of four beams strongly bolted together. Below this frame, and extending transversely across it, is the axle B, carrying on its ends, outside of the frame, the propelling-wheels C D, both of which are allowed to turn loosely on their axle when the machine is backed or turned short around; but when the machine is moved forward both wheels are connected to their shaft or axle B, and cause this axle to turn with them. For this purpose the hubs of the wheels are recessed and receive the spring-pawls $a$, which engage with the ratchet-teeth $a'$ on the inside of each hub, as clearly shown in Fig. 8 of the drawings. The detent or pawl $a$ is pivoted to the collar $b$ of the wheel D, and the pawl which engages the wheel C with its shaft is pivoted to the hub $b'$ of the inside spur-wheel, E. (Shown in Fig. 3.) Both hubs $b$ and $b'$ are keyed to the axle B, one directly and the other indirectly, as will be hereinafter described.

The principal driving-wheel, C, together with the main driving spur-wheel E, is arranged upon a short tapering tubular axle, $c$, through which the end of the main axle passes, and to which this axle is keyed by means of the pin $d$. (Shown in Fig. 3.) The hole through this short axle $c$ is somewhat larger at its outer (as well as its inner) end than the axle B, and a slotted tube, $e$, is introduced at this end for the purpose of centering the tubular axle $c$, and also for furnishing a proper bearing for its outer end. The inner end of this axle $c$ is of a much greater diameter than the outer end—*i. e.*, the axle $c$ has a hole through it diverging toward the opposite wheel, D, for the purpose of allowing the axle B a vibrating motion transversely of the path of the machine. The large wheel C in this case serves as a fulcrum about which the axle B moves. The inner beam of the draft-frame A is supported on this short axle $c$, as shown in Figs. 3 and 4, and the main driving spur-wheel E is also supported on and keyed to this short axle, so that when the machine is propelled forward, the short axle being keyed to the main axle, the spur-wheel E will be rotated and communicate this rotary motion to the driving-pinion $f$, which will in turn communicate a rapid rotary motion to the crank-wheel $g$ through the medium of beveled spur-wheels $h\ h'$ and their shafts $i\ i'$, as shown clearly in Figs. 1 and 2 of the drawings.

The outer end of frame A is connected to the axle B by means of a deep slotted stirrup, G, which is bolted to the bottom of this frame, and extends some distance below it, and within the vertical slots in this stirrup plays a journal-box, $j$, which keeps the axle B at this end in its place and allows it only to move up and down in the stirrup, or vice versa. The lower edge of the longitudinal beam of frame A may also be slotted or recessed, if desirable, (shown in Fig. 1,) to allow the outer end of the frame to be depressed as far as it is required.

H H' are two brackets which are secured respectively to and project from the side of the front and rear ends of the frame-timber A, and have eye-bearings in their ends for receiving and supporting a rod, $k$, which is fixed at its ends to the supports H H'. Both of these supports for the inclined rod $k$ incline downward, the lowermost one, H', being sufficiently inclined to allow the curved shoe to rest upon the ground when the cutting apparatus is in an operative position. Still it does not extend so far down as to be in the way of obstructions when the cutting apparatus is thrown up out of the way in moving the machine from one field to another. On this inclined rod $k$ a tubular portion, $l$, is slipped, to the lower end of which the inner shoe, $m$, is securely attached, or, rather, the heel portion of the shank of this shoe. The tube $l$ is thus made a means for pivoting the shoe $m$, together with the entire cutting apparatus, to the stationary rod $k$, and this tube, together with the rod $k$, which rod is also supported at its center by means of the strap $n$ on the projecting end of the tubular axle $c$, furnishes a firm support and braces the cutting apparatus securely to the draft-frame A, and also allows the cutting apparatus to be folded up out of the way when it is not in immediate use. When this cutting apparatus is to be used in the field it is adjusted in the position indicated in Figs. 1, 2, 3, and 4, and locked in this position by means of the pivoted latch $p$, which catches in a notch in the plate $p'$, that projects up from the shoe $m$. This latch-fastening keeps the cutting apparatus down, and the jog $r$ prevents the cutting apparatus from falling too far. The cutting apparatus being fixed in this manner rigidly to the frame A, it will be seen that if this frame A were also fixed rigidly to the axle B the outer end of the cutting apparatus would not rise and fall and adapt itself to uneven land, and this end of the cutting apparatus would sometimes be forced hard upon (or into) the ground, and sometimes be raised very far from the ground, thus leaving the stubble very unevenly cut; but the greatest evils would be that the side draft on the machine would be too great to be overcome by ordinary means, and the cutting apparatus would be very liable to become broken or deranged. In the machine which I have above described I have combined in a double-wheel machine the advantages of allowing the entire cutting apparatus to float evenly over the surface of the ground and accommodate itself thereto, whether the surface be very uneven or level. It will be seen that I do not accomplish this by the usual mode of pivoting the cutting apparatus, or the shoe thereof, to the frame of the machine, nor by hanging the cutting apparatus or the frame of the machine in the center of the axle; but in my machine the flaring axle $c$ and the stirrup G, through which the axle passes, allow the entire frame A and the cutting apparatus to rock upon the fulcrum or driving wheel C. By this arrangement the cutting apparatus is not only allowed to rise and fall, but the frame is self adjustable, and the outer wheel, D, is allowed to rise and fall in passing over obstructions without tipping its opposite wheel, C, or affecting the position of the cutting apparatus. A very much greater amount of motion is obtained in the oscillation of the draft-frame, and this frame serves to counteract or counterbalance the weight of the cutting apparatus, thus allowing the latter to float freely over the surface of uneven ground.

When it is desired to transport the machine about from place to place the machinery which gives motion to the sickle is thrown out of gear, and the cutting apparatus is unlocked by raising the latch $p$ and thrown back upon or against the draft-pole J. The weight of the cutting apparatus will now be supported by the frame A upon the two propelling-wheels C D alike. Thus it will be seen the pivoting of the cutting apparatus to the frame A is intended merely to admit of the same being thrown or folded up when it is not in immediate use; but when in use the cutting apparatus is allowed to rise and fall in consequence of the oscillating motion which the frame A is allowed to have, the cutting apparatus being securely locked at its point of connection with the frame A, as above described.

The draft-pole J is supported at its rear end upon the transverse axle B by means of the cylindrical band-connection $s$, and this pole extends forward over the front end of frame A and between two perpendicular standards, $t\ t'$. The long curved lever $v$ is pivoted to the standard $t'$, and its lower end bears upon the upper surface of the pole J, as shown in Figs. 1, 2, and 4 of the drawings. The stop-pin $w$ on the pole J checks the lever and prevents the frame A (its forward end) from dropping down too far. By means of this lever $v$ the driver, who sits in the seat K, can raise or depress the forward end of frame A, and with it the cutting apparatus, whenever he may deem it necessary. The draft-pole J, it will be seen by reference to the drawings, is brought as near the main supporting-wheel C as possible with a pole. The object of this arrangement is to prevent, to a great extent, the side draft which would occur by putting the draft-pole in or nearly in the center of the frame A, and to still further overcome the side draft I attach the double-tree P to a rod, R, which is pivoted to a staple that is on the inner side beam of the frame A, between the pole J and the main supporting-wheel C. The rod R extends forward and rests on the hooked support T, which projects from the side of pole J. By this arrangement the horses pull upon the rod R and the side draft on the cutting apparatus is very much diminished, the machine being nearly, if not quite, balanced.

The pitman S is connected at one end to the crank-wheel $g$ and at the other end to the sickle-bar S', which is in a vertical plane with the pitman. The finger-beam V is rigidly bolted at its inner end to the shoe $m$, and the fingers are secured to this beam in the usual manner.

In Figs. 6 and 7 I have shown an improved cutter or sickle, which consists of the usual V-shaped cutters; but instead of beveling both cutting-edges downward, so that they both cut in one plane, one edge is beveled downward and cuts against the edge of the lower half, $a^2$, of the finger, and the other edge is beveled upward and cuts against the edge of the upper half, $a^3$, of the finger. The upper half or false finger, $a^3$, is arranged over the lower half of the finger, so that a vertical space is left between them sufficient to prevent the cutters from clogging up, as shown in Figs. 6 and 7. This space is produced by reducing one side of the upper half of the finger opposite the cutting-edge of this half, and as the sickle reciprocates through the fingers the V-shaped cutters clear themselves of any grass, &c., which would have a tendency to clog them or prevent them from working freely.

When the cutters or sickles of harvesters are made with a double basil-edge inclining downward, so as to cut against the lower surfaces of the teeth or fingers only, it is always the case that the upper surfaces of the fingers fail, after a time, to keep the cutters down upon their finger-bearing surfaces; and although these cutters perform their work well at first, it is evident that as soon as their upper bearings wear a little, so that the cutters are not held down firmly on the cutting-edges of the fingers, the cutting operation will be seriously impaired. In my arrangement the cutting is performed on the lower parts of the fingers as the sickles make one stroke and on the upper parts of the fingers in the return-stroke of the sickle, thus dividing the strain equally between the two parts of the fingers. This gives me two cutting-planes and an upward and lower bearing for the sickle, between which the friction is equally distributed and the sickle more perfectly balanced.

It is obvious that the greater portion of my improvements in harvesters is applicable to both that class of side-draft machines which have their cutting apparatus forward of the drive-wheels, and that class which have the cutting apparatus in rear of the drive-wheels, and therefore I do not limit myself to any particular style of harvesters.

Having thus described my invention, what I claim as new, and desire to secure by Letters Patent, is—

1. Supporting the frame of a reaping or mowing machine in such manner that its weight, together with that of the cutting apparatus, will be supported on or sustained by one wheel of a double-wheel machine, when the wheels are used together for the purpose described, by means substantially as set forth.

2. Making the main draft-frame A to counterbalance the weight of the cutting apparatus in a double-wheel machine when both the cutting apparatus and the draft-frame are supported upon the propelling-wheel C, and this wheel made to serve as the fulcrum of both, substantially as described.

3. So supporting the main draft-frame A upon the tapering axle $c$ of the wheel C that the outer wheel, D, is allowed to rise and fall in surmounting obstacles without tipping or otherwise affecting either the wheel C or the position of the cutting apparatus, substantially as described.

4. The elongated stirrup G, in combination with frame A, vibrating axle B, and short axle $c$, substantially as described.

5. The wheel C, arranged upon a tapering tubular axle, $c$, substantially in the manner and for the purposes described.

6. Supporting the main draft-frame A upon a short tubular axle, $c$, at one side, and guiding said frame in its vibrating motions by means of the stirrup G and box $j$, substantially as described.

7. In combination with a draft-frame supported and balanced substantially as described, the tongue or pole J, pivoted to the vibrating axle B and supporting the driver's seat K, arranged substantially as described.

8. The combination, with the oscillating frame A, supported and controlled in its motions, as described, of the auxiliary axle B and wheel D, substantially as described.

9. Pivoting the inner shoe, $m$, of the finger-bar V to the frame A by means of the tubular connection $l$, fixed rod $k$, and front and rear supports, H H', and central support, $n$, substantially as described.

10. Keying the main driving spur-wheel E to the tubular axle $c$ and connecting said wheel to the fulcrum-wheel C by means of a ratchet and detent, or their equivalents, substantially as described.

11. The two large supporting-wheels C D, in combination with the auxiliary oscillating axle B and oscillating frame A, arranged and operating substantially as described.

WM. VAN ANDEN.

Witnesses:
ROBT. N. PALMER,
H. D. VARICK.